US 6,848,115 B2

United States Patent
Sugiura et al.

(10) Patent No.: US 6,848,115 B2
(45) Date of Patent: Jan. 25, 2005

(54) OPTICAL RECORDING MEDIUM USING SCATTERING BODIES TO ENHANCE MODULATION

(75) Inventors: Satoshi Sugiura, Saitama (JP); Akihiro Tachibana, Saitama (JP); Yuzo Yamakawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 281 days.

(21) Appl. No.: 09/969,590

(22) Filed: Oct. 4, 2001

(65) Prior Publication Data

US 2002/0051422 A1 May 2, 2002

(30) Foreign Application Priority Data

Oct. 6, 2000 (JP) .................................... P2000-308064

(51) Int. Cl.[7] .............................................. G11B 3/70
(52) U.S. Cl. .................................... 720/719; 428/64.4
(58) Field of Search ......................... 369/13.41, 275.1; 428/64.4

(56) References Cited

U.S. PATENT DOCUMENTS

| | | | | |
|---|---|---|---|---|
| 5,867,316 A | * | 2/1999 | Carlson et al. | 359/500 |
| 6,187,406 B1 | * | 2/2001 | Ichihara et al. | 428/64.1 |
| 6,266,315 B1 | * | 7/2001 | Lee et al. | 369/112.01 |
| 6,296,915 B1 | * | 10/2001 | Yusu et al. | 428/64.1 |
| 6,385,162 B1 | * | 5/2002 | Nagase et al. | 369/288 |
| 6,404,722 B1 | * | 6/2002 | Tseng et al. | 369/112.01 |
| 2001/0014061 A1 | * | 8/2001 | Ueyanagi | 369/44.23 |

FOREIGN PATENT DOCUMENTS

EP    0 884 723 A2    12/1998
EP    1 120 780 A2    8/2001
JP    06-044609    *    2/1994    ............ G11B/7/24

OTHER PUBLICATIONS

MAT (Machine Assisted Translation) of JP 06–044609.*
Hiroshi Fuji et al: "A near–field recording and readout technology using a metallic probe in an optical disk" Japanese Joournal of Applied Physics. Publication Office Japanese Jornal of Applied Physics, vol. 39, No. 2B Part 1, Feb 2000 pp. 980–981.
Klar T. et al: "Surface Plasmon Resonances in Single Metallic Manoparticles" Physical Review Letters, New York, NY vol. 80, No. 19, May 11, 1998 pp. 4249–4252.
Tominaga J. et al: "The characteristics and the potential of super resolution near–field structure" Jpn. J. Appl. Phys. 1, Regul. Pap. Short Notes Rev. Pap. Japanese Journal of Applied Physics, Part 1, Feb. 2000, Publication Office, Japanese Journal Appl. Phys. Japan, vol. 39, No. 2B Feb 2000, pp. 960–961.
Kume T et al: "Light emission from surface plasmon polaritons mediated by metallic fine particles" Physical Review Letters, New York, NY vol. 55, No. 7, Feb. 15, 1997, pp. 4774–4782.

* cited by examiner

Primary Examiner—Aristotelis Psitos
(74) Attorney, Agent, or Firm—Sughrue Mion, PLLC

(57) ABSTRACT

In an optical recording medium having a super-resolution layer structure using near-field light, comprising a readout layer 3 for forming a light scattering region 9 in the center portion of a laser spot, and a recording layer 5 for receiving near-field light 10 generated from the light scattering region 9 of the readout layer 3, scattering bodies 61 for increasing the generated near-field light are provided while enhancing a scattering effect of the near-field light 10 applied to a mark 51 of the recording layer 5.

25 Claims, 5 Drawing Sheets

PATTERN 1

PATTERN 2

PATTERN 3

PATTERN 4

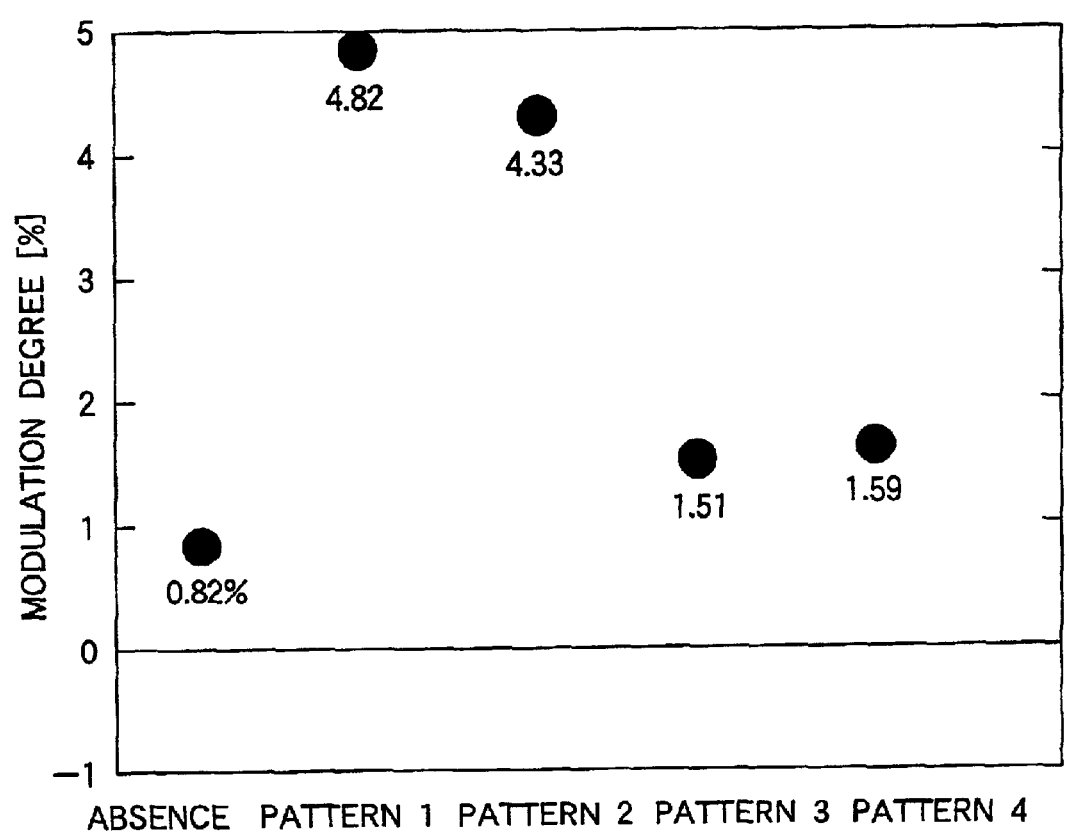

OPTICAL RECORDING MEDIUM USING SCATTERING BODIES TO ENHANCE MODULATION

BACKGROUND OF THE INVENTION

1. Field of the Invention

The present invention relates to an optical recording medium capable of making a high density record using a principle of a super-RENS.

2. Description of the Related Art

As a method for implementing an optical record of high density, a recording and reproducing technique referred to as a super-RENS (super-Resolution Near-field Structure) using near-field light has been known (for example, O plus E Vol.22, No.2 Pages.202 to 207, February, 2000). An optical disk (super-RENS disk) using a super-RENS method provides a readout layer in addition to a recording layer. The readout layer has properties in which reflectance becomes high at room temperature and transmittance becomes high at high temperature, and when a laser is applied, a fine opening with high transmittance is formed in a high temperature portion of the center of a laser spot. When near-field light occurring from this fine opening reaches a mark of the recording layer, the near-field light is converted into propagation light and a part of the light is reflected toward a pickup and information recorded in the recording layer as a mark is reproduced.

However, in such a super-RENS disk, a change in intensity of the reflected light according to the presence or absence of the mark of the recording layer, namely a degree of modulation is insufficient and in order to commercialize the super-RENS as an optical disk, it is necessary to improve the degree of modulation.

SUMMARY OF THE INVENTION

An object of the invention is to provide an optical recording medium using a super-RENS method capable of securing a large degree of modulation.

An optical recording medium having a super-resolution layer structure using near-field light of the invention is characterized in that in an optical recording medium having a super-resolution layer structure using near-field light, comprising a readout layer (3) for forming the near-field light in the center portion of a laser spot, and a recording layer (5) for receiving the near-field light generated in the readout layer (3), scattering bodies (61) are provided.

The generated near-field light can be increased while enhancing a scattering effect of the near-field light applied to a mark (51) of the recording layer (5) by the scattering bodies (61). Therefore, a degree of modulation can be improved. The scattering bodies (61) may be formed in a particle shape or a dot shape, or may be formed in a line shape. In the dot shape, a rectangle, a circle or other shapes can be selected arbitrarily. The line may be formed parallel to tracks of the recording layer or along the tracks, or may be formed vertical to the tracks or slant to the tracks. In the case of forming the scattering bodies (61) in a line shape or forming particles or dots of the scattering bodies (61) in a line shape, it is easy to arrange the scattering bodies (61) equivalently with respect to the mark (51) over the entire tracks when lines are formed along spiral tracks, so that there are advantages that it becomes easy to maintain a constant degree of modulation over the entire tracks or it becomes easy to manufacture the optical recording medium.

As the scattering bodies (61), for example, any metal can be used. A method for reading the mark (51) of the recording layer (5) may be a method for capturing the reflected light or a method for capturing the transmitted light. Also, a wavelength of laser light for reading information of the recording layer (5), a numerical aperture of an objective lens, etc. are not limited to an embodiment. A polarization direction of the laser light for reading information of the recording layer (5) may be a direction along the tracks of the recording layer or may be a direction vertical to the tracks or a direction slant to the tracks. The laser light may not be linearly polarized light.

For example, gold may be used as the scattering bodies (61).

A scattering body holding layer (6) for holding the scattering bodies (61) is provided, and the scattering body holding layer (6) may be provided in the opposite side of the readout layer (3) with the recording layer (5) sandwiched. In this case, the scattering body holding layer (6) can easily be arranged in a position close to the recording layer (5), so that the generated near-field light can effectively be increased while efficiently enhancing a scattering effect of the near-field light (10) by the scattering bodies (61).

The scattering bodies (61) may be provided in the recording layer (5). In this case, the scattering bodies (61) can be arranged close to the mark (51), so that a scattering effect of the near-field light (10) by the scattering bodies (61) can be enhanced efficiently.

A scattering body holding layer for holding the scattering bodies (61) is provided, and the scattering body holding layer may be provided between the recording layer (5) and the readout layer (3). In this case, the scattering body holding layer can easily be arranged in a position close to the recording layer (5), so that a scattering effect of the near-field light (10) by the scattering bodies (61) can be enhanced efficiently. In this case, the scattering bodies may be arranged in a gap layer (4) provided between the recording layer (5) and the readout layer (3).

The scattering bodies (61) may be made of particulate matter.

The scattering bodies (61) maybe formed in a line shape. In this case, particulate scattering bodies may be arranged in a line shape or the scattering bodies (61) may be formed in a line shape. A direction of the line may be a direction along the tracks of the recording layer (5) or may be a direction vertical to the tracks or a direction slant to the tracks.

Incidentally, in order to facilitate an understanding of the invention, reference numerals of the accompanying drawings are designated by parentheses, but thereby the invention is not limited to the embodiment shown in the drawings.

BRIEF DESCRIPTION OF THE DRAWINGS

FIGS. 2A to 2D are diagrams showing a position relation between scattering bodies and marks, in which FIG. 2A is a diagram showing pattern 1, FIG. 2B is a diagram showing pattern 2, FIG. 2C is a diagram showing pattern 3, and FIG. 2D is a diagram showing pattern 4, respectively;

FIG. 3 is a diagram showing an effect of the scattering bodies in each of the examples of patterns 1 to 4;

DETAILED DESCRIPTION OF THE PREFERRED EMBODIMENTS

Figure 1:
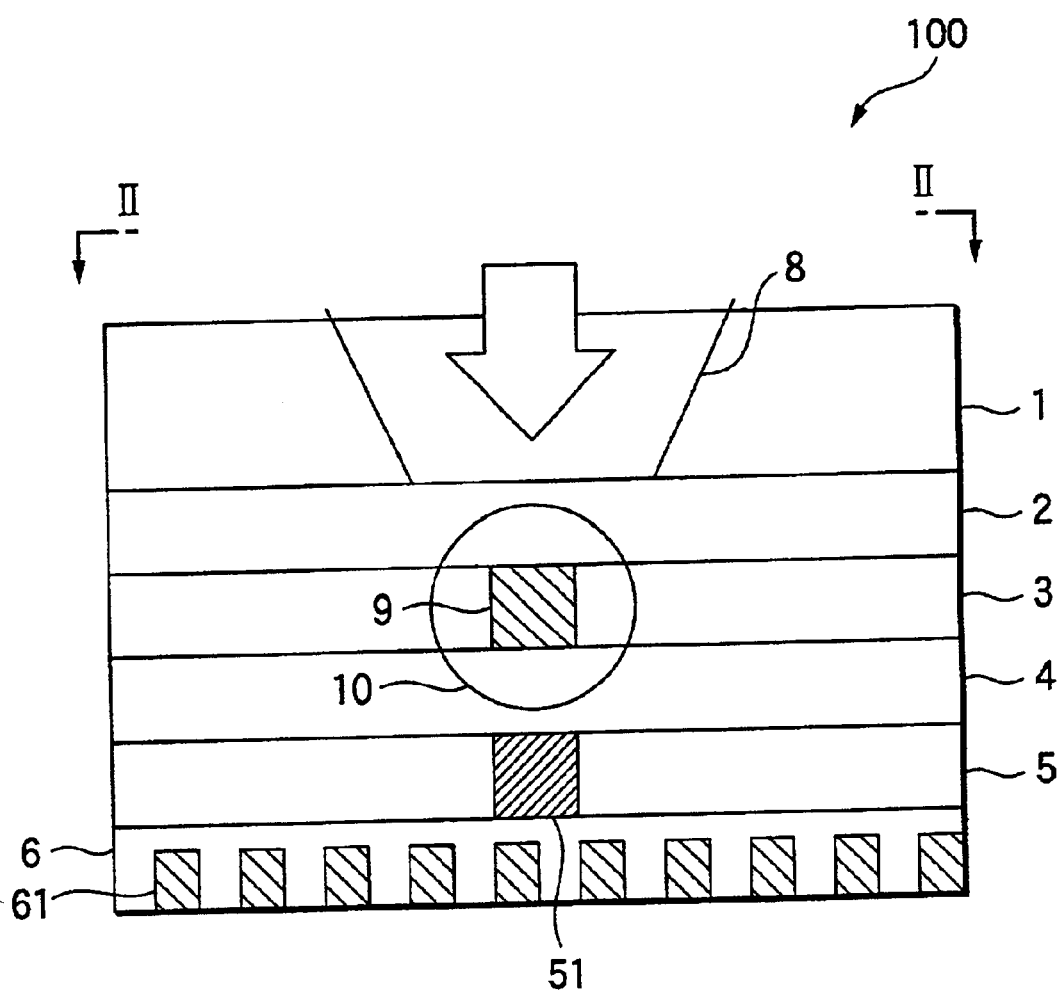
FIG. 1 is a sectional view schematically showing an optical recording medium of the present embodiment.

One embodiment of an optical recording medium of the invention will be described below with reference to FIGS. 1 to 4. FIG. 1 is a sectional view schematically showing the optical recording medium of the embodiment, and FIG. 2 is a diagram showing arrangement states of scattering bodies.

As shown in FIG. 1, an optical recording medium 100 of the embodiment is constructed by sequentially stacking a substrate 1 made of glass or polymeric material, a protective layer 2 made of ZnS—$SiO_2$, a readout layer 3 made of AgOx, a gap layer 4 made of ZnS—$SiO_2$, a recording layer 5 made of GeSbTe and a protective layer 6 made of ZnS—$SiO_2$ from the top toward the bottom in FIG. 1. As a thickness of each the layer, for example, the gap layer 4 is 20 to 30 nm in thickness and the recording layer 5 is 30 nm in thickness and the protective layer 6 is 20 nm in thickness. The protective layer 2, the readout layer 3, the gap layer 4, the recording layer 5 and the protective layer 6 can be formed using a vapor deposition method etc. publicly known.

As shown in FIG. 1, a mark 51 acting as record information is formed in the recording layer 5. Also, scattering bodies 61 made of Au for improving a degree of modulation are provided in the protective layer 6. FIGS. 2A to 2D illustrate an arrangement method of the mark 51 and the scattering bodies 61 in the case of viewing the optical recording medium 100 from a direction of line II—II of FIG. 1. The marks 51 are provided along spirally or concentrically formed tracks in a manner similar to a normal optical disk.

Figure 2A:
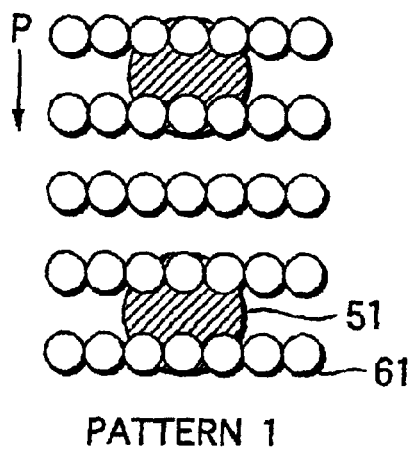

In an example of pattern 1 shown in FIG. 2A, the scattering bodies 61 are arranged in a line shape at predetermined intervals vertical to a direction of reading by a pickup shown by arrow P. It is set so that a diameter of the scattering body 61 is finer than a diameter of the mark 51 of the recording layer 5 or a pitch of lines of the scattering bodies 61 is smaller than a pitch of the marks 51. In an example of pattern 2 shown in FIG. 2B, in a manner similar to the example of pattern 1, the scattering bodies 61 are arranged in a line shape at predetermined intervals vertical to the direction of reading by the pickup shown by arrow P, but a position relation between the mark 51 and the scattering bodies 61 differs. That is, in pattern 1 of FIG. 2A, the scattering bodies 61 are arranged so as to form the lines in a portion close to the edge of the mark 51, but in pattern 2 of FIG. 2B, the scattering bodies 61 are arranged so as to form the lines in the vicinity of the center of the mark 51.

Figure 2B:
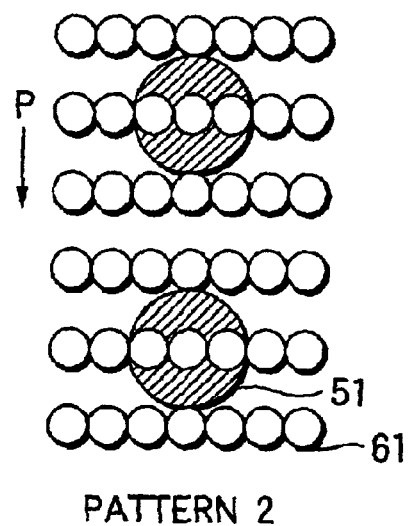
Figure 2C:
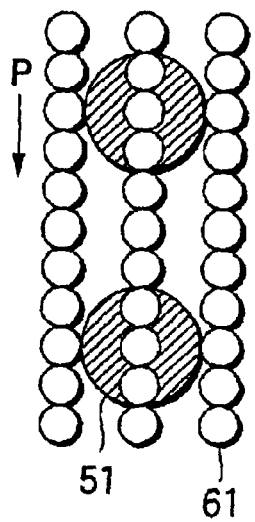

In an example of pattern 3 shown in FIG. 2C, the scattering bodies 61 are arranged in a line shape at predetermined intervals parallel to the direction of reading by the pickup shown by arrow P. It is set so that a diameter of the scattering body 61 is finer than a diameter of the mark 51 of the recording layer 5 or a pitch of lines of the scattering bodies 61 is smaller than a pitch of the marks 51. In an example of pattern 4 shown in FIG. 2D, in a manner similar to the example of pattern 3, the scattering bodies 61 are arranged in a line shape at predetermined intervals parallel to the direction of reading by the pickup shown by arrow P, but a position relation between the mark 51 and the scattering bodies 61 differs. That is, in pattern 3 of FIG. 2C, the scattering bodies 61 are arranged so as to form the lines in the vicinity of the center of the mark 51, but in pattern 4 of FIG. 2D, the scattering bodies 61 are arranged so as to form the lines overlapping with the mark 51 in a portion close to the edge of the mark 51.

Next, a method for reading the mark 51 of the optical recording medium 100 will be described. As shown in FIG. 1, when a laser beam 8 is applied from the side of the substrate 1, the readout layer 3 is heated in the center of a spot of the laser beam 8 and AgOx (silver oxide) of the readout layer 3 chemically decomposes into silver and oxygen. In the readout layer 3, reflectance is low in a state of AgOx in room temperature but reflectance of silver generated by decomposition at the time of the heating is high, so that a fine light scattering region 9 is formed. Near-field light 10 is generated around this light scattering region 9 and this near-field light 10 reaches the recording layer 5. Propagation light occurs by interaction between the near-field light 10 and the recording layer 5, and this propagation light passes through the readout layer 3, the protective layer 2 and the substrate 1 and is received by a pickup and thereby, a mark 51 formed in the recording layer 5 is read. Since the chemical decomposition of AgOx (silver oxide) in the readout layer 3 occurs in a region very smaller than the spot of the laser beam 8, a reading radius smaller than a spot size of the laser beam 8 can be obtained.

The spot of the laser beam 8 moves along spirally formed tracks and a high temperature portion of the readout layer 3 moves with the movement of the spot and a cooled portion returns to AgOx again by reversible reaction, so that the optical recording medium 100 can be reproduced repeatedly.

In the optical recording medium 100 of the embodiment, the scattering bodies 61 are provided close to the recording layer 5, so that the propagation light occurring by the interaction between the near-field light 10 and the recording layer 5 is amplified.

FIG. 3 is a diagram showing an effect of the scattering bodies 61 in each the example of patterns 1 to 4 of FIGS. 2A to 2D, and a three-dimensional FDTD method (Finite Difference Time Domain Method) in consideration of polarization of a dielectric (reference: J. B. Judikins, R. W. Ziolkowski, J.Opt.Soc.Am.A, 12, 9, 1974–1983, 1995) by a Lorentz model was used as an analysis technique.

As a calculation model, the case that the mark 51 within the recording layer 5 is a phase change region with a diameter of 120 mm spaced equally and the light scattering region 9 of the readout layer 3 is Ag (silver) particles with the same size as that of the mark 51 is assumed. Also, the scattering body 61 of the protective layer 6 is a rectangular parallelepiped of Au (gold) with a size of 40 nm×40 nm×15 nm (thickness: width of a vertical direction of FIG. 1). Incidentally, this is equivalent to the case that the scattering body 61 is formed in a prism shape (lineshape) which is a rectangle with a sectional shape of 40 nm×15 nm. A wavelength of an incident beam is 635 nm and polarized light is linearly polarized light of a direction (radial direction) vertical to a direction of reading by a pickup shown by arrow P.

A degree of modulation is defined by "a degree of modulation $=(I_{off}-I_{on})/(I_{off}+I_{on})$". Here, $I_{off}$ and $I_{on}$ are signal intensity in an off-mark (a region other than the mark 51) and an on-mark (a region on the mark 51) at the time of scanning the tracks in which the marks 51 are arranged by the laser beam, respectively, and these are integral values of the quantity of reflected light returning within an objective lens with a numerical aperture of 0.6.

Figure 2D:
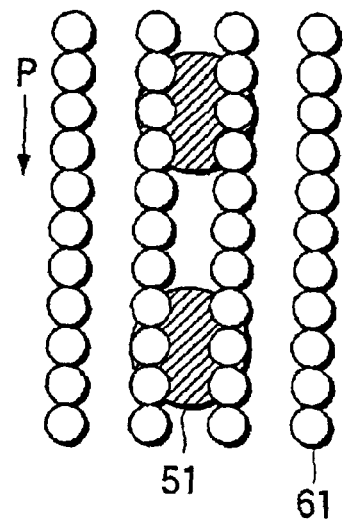

An "absence" in FIG. 3 shows a degree of modulation in the case that the scattering bodies are not provided, and "pattern 1" shows a degree of modulation in pattern 1 of FIG. 2A, and "pattern 2" shows a degree of modulation in pattern 2 of FIG. 2B, and "pattern 3" shows a degree of modulation in pattern 3 of FIG. 2C, and "pattern 4" shows a degree of modulation in pattern 4 of FIG. 2D, respectively.

Figure 4:
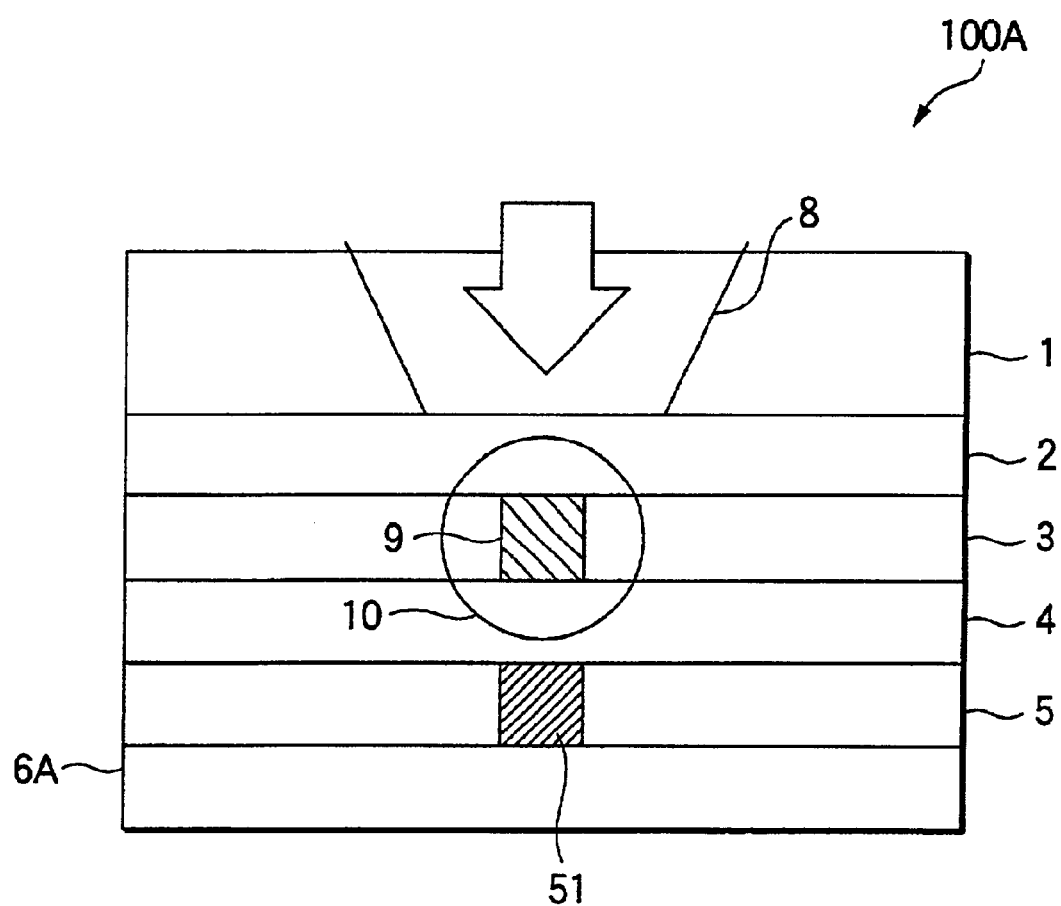
FIG. 4 is a sectional view schematically showing an optical recording medium in which scattering bodies are not provided.

FIG. 4 is a sectional view schematically showing an optical recording medium in the case that the scattering bodies are absent, and the same numerals are designated to the same configuration elements as those of FIG. 1. This optical recording medium 100A is constructed by sequentially stacking a substrate 1 made of polymeric material, a protective layer 2 made of ZnS—SiO$_2$, a readout layer 3 made of AgOx, a gap layer 4 made of ZnS—SiO$_2$, a recording layer 5 made of GeSbTe and a protective layer 6A made of ZnS—SiO$_2$ from the top toward the bottom in FIG. 1. As shown in FIG. 4, scattering bodies corresponding to the scattering bodies 61 are not formed in the protective layer 6A of the optical recording medium 100A, and the optical recording medium 100A differs from the optical recording medium 100 of FIG. 1 in this point.

Figure 5:
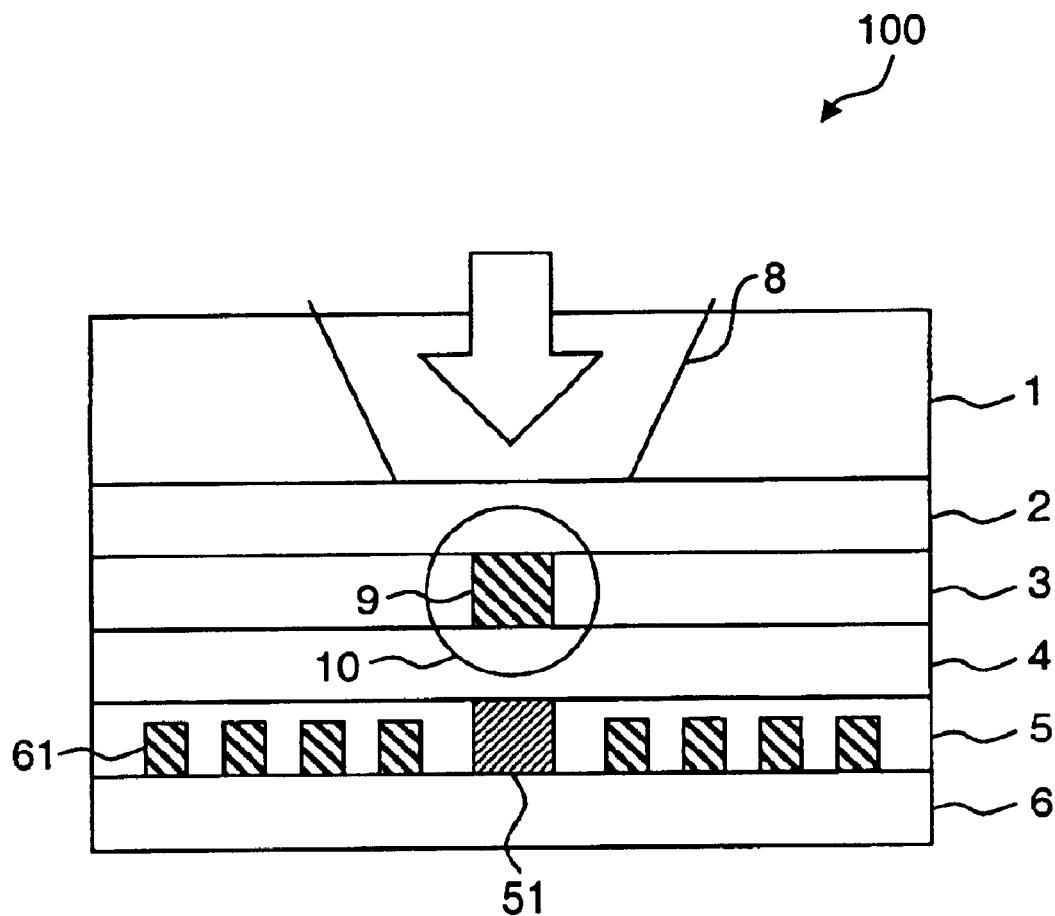
FIG. 5 is an embodiment of the invention schematically showing a sectional view of an optical recording medium wherein scattering bodies are provided in a recording layer.

FIG. 5 illustrates an embodiment of the invention schematically showing a sectional view of an optical recording medium wherein scattering bodies 61 are located in the recording layer 5. Other than the scattering bodies 61 being located in the recording layer 5, the remaining features of FIG. 5 are similar to those described in FIG. 1, and therefore identically numbered features are not again discussed so as to avoid being redundant.

As shown in FIG. 3, a degree of modulation is 0.82% in the case that the scattering bodies are absent and is 4.82% in the case of pattern 1 and is 4.33% in the case of pattern 2 and is 1.51% in the case of pattern 3 and is 1.59% in the case of pattern 4, respectively, and the degree of modulation of any case of patterns 1 to 4 in which the scattering bodies 61 are provided becomes larger than that of the case that the scattering bodies are absent. Particularly in pattern 1 and pattern 2, it is found that the degree of modulation increases by about 4 to 5 times compared with the case that the scattering bodies 61 are absent, and an effect of an improvement in the degree of modulation by the scattering bodies 61 is remarkable.

In the embodiment described above, the case that the particulate scattering bodies are arranged has been shown, but the scattering bodies may be formed in a line shape.

According to the optical recording medium using the super-RENS method of the invention thus, the degree of modulation can be improved remarkably by enhancing a scattering effect of the near-field light 10 applied to the mark 51 by the scattering bodies 61. Incidentally, a material of the scattering body, a formation pattern of the scattering body, a size of the scattering body, a position relation between the scattering body and the recording layer, a material or thickness of other layers, etc. are not limited to the embodiment described above.

What is claimed is:

1. An optical recording medium having a super-resolution layer structure using near-field light, comprising:
   a readout layer for forming the near-field light in the center portion of a laser spot;
   a recording layer for receiving the near-field light generated in the readout layer; and
   a scattering bodies layer containing scattering bodies for enhancing a scattering effect of the near-field light.

2. The optical recording medium as defined in claim 1, wherein said scattering bodies are made of metal.

3. The optical recording medium as defined in claim 2, wherein said scattering bodies are made of gold.

4. The optical recording medium as defined in claim 1, wherein said scattering bodies are made of particulate matter.

5. The optical recording medium as defined in claim 1, wherein said scattering bodies are formed in a line shape.

6. The optical recording medium as claimed in claim 1, wherein the scattering bodies are arranged in lines perpendicular to a reading direction of a pickup.

7. The optical recording medium as claimed in claim 6, wherein a width of the scattering bodies is smaller than a width of a mark recorded in the recording layer.

8. The optical recording medium as claimed in claim 6, wherein a pitch of the lines of scattering bodies is smaller than a pitch of marks recorded in the recording layer.

9. The optical recording medium as claimed in claim 6, wherein the lines of scattering bodies are disposed in a vicinity of edges of marks recorded in the recording layer when viewed along a propagating direction of a laser forming the laser spot.

10. The optical recording medium as claimed in claim 6, wherein the lines of scattering bodies are disposed in a vicinity of centers of marks recorded in the recording layer when viewed along a propagating direction of a laser forming the laser spot.

11. The optical recording medium as claimed in claim 1, wherein the scattering bodies are arranged in lines parallel to a reading direction of a pickup.

12. The optical recording medium as claimed in claim 11, wherein a width of the scattering bodies is smaller than a width of a mark recorded in the recording layer.

13. The optical recording medium as claimed in claim 11, wherein a pitch of the lines of scattering bodies is smaller than a pitch of marks recorded in the recording layer.

14. The optical recording medium as claimed in claim 11, wherein the lines of scattering bodies are disposed in a vicinity of edges of marks recorded in the recording layer when viewed along a propagating direction of a laser forming the laser spot.

15. The optical recording medium as claimed in claim 11, wherein the lines of scattering bodies are disposed in a vicinity of centers of marks recorded in the recording layer when viewed along a propagating direction of a laser forming the laser spot.

16. An optical recording medium having a super-resolution layer structure using near-field light, comprising:
    a readout layer for forming the near-field light in the center portion of a laser spot;
    a recording layer for receiving the near-field light generated in the readout layer;
    scattering bodies for enhancing a scattering effect of the near-field light; and
    a scattering body holding layer for holding said scattering bodies, said scattering body holding layer being provided at an opposite side of said readout layer with the recording layer sandwiched.

17. An optical recording medium having a super-resolution layer structure using near-field light, comprising:
    a readout layer for forming the near-field light in the center portion of a laser spot;
    a recording layer for receiving the near-field light generated in the readout layer; and
    scattering bodies for enhancing a scattering effect of the near-field light, wherein said scattering bodies are provided in said recording layer.

18. An optical recording medium having a super-resolution layer structure using near-field light, comprising:
    a readout layer for forming the near-field light in the center portion of a laser spot;
    a recording layer for receiving the near-field light generated in the readout layer;

scattering bodies for enhancing a scattering effect of the near-field light; and a scattering body holding layer for holding said scattering bodies, said scattering body holding layer being provided between said recording layer and said readout layer.

19. An optical recording medium, comprising:

a first layer in which receives a light beam, wherein near-field light is formed in the first layer in a footprint of the light beam; and a second layer that receives the near-field light and that records data as marks; and scattering bodies for enhancing a scattering effect of the near-field light, wherein the scattering bodies are formed in lines, and wherein the lines are disposed in a vicinity of at least one of centers and edges of the marks when viewed along a propagating direction of the light beam.

20. The optical recording medium as claimed in claim 19, wherein the lines of scattering bodies are arranged parallel to a reading direction of a pickup.

21. The optical recording medium as claimed in claim 19, wherein the lines of scattering bodies are arranged perpendicular to a reading direction of a pickup.

22. The optical recording medium as claimed in claim 19, wherein a width of the scattering bodies is smaller than a width of the marks recorded in the recording layer.

23. The optical recording medium as claimed in claim 19, wherein a pitch of the lines of scattering bodies is smaller than a pitch of the marks recorded in the recording layer.

24. The optical recording medium as claimed in claim 19, wherein the lines of scattering bodies are disposed in the vicinity of the edges of the marks.

25. The optical recording medium as claimed in claim 19, wherein the lines of scattering bodies are disposed in the vicinity of the centers of the marks.

* * * * *